United States Patent [19]

Brisson

[11] Patent Number: 4,916,731

[45] Date of Patent: Apr. 10, 1990

[54] DEVICE TO MONITOR THE CONTENT AND/OR DURATION OF THE DISPLAY OF ADVERTISEMENTS

[75] Inventor: Pierre Brisson, Meyrargues, France

[73] Assignee: SGS-Thomson Microelectronics SA, Gentilly, France

[21] Appl. No.: 246,998

[22] Filed: Sep. 20, 1988

[30] Foreign Application Priority Data

Sep. 28, 1987 [FR] France ................................ 87 13353

[51] Int. Cl.[4] ..................... H04M 11/00; H04M 17/00

[52] U.S. Cl. ........................................ 379/96; 379/144

[58] Field of Search ................. 379/144, 155, 91, 132, 379/136, 140, 96, 453; 235/380, 381

[56] References Cited

U.S. PATENT DOCUMENTS 4,367,402 1/1983 Giraud et al. ........................ 235/380

4,797,914 1/1989 Vaello .................................. 379/96

FOREIGN PATENT DOCUMENTS 0196526 10/1986 European Pat. Off. .

275645 5/1951 Fed. Rep. of Germany .

3512005 10/1986 Fed. Rep. of Germany ...... 379/144

61-58368 3/1986 Japan .................................. 379/453

OTHER PUBLICATIONS

Weinstein, Stephen B., "Smart Credit Cards: The Answer to Cashless Shopping", IEEE Spectrum, 2/84.

*Primary Examiner*—Keith E. George

*Attorney, Agent, or Firm*—Roland Plottel

[57] ABSTRACT

The period for which advertisements are displayed on display screens is monitored by coupling the displaying time with the time of a telephone call from a public telephone booth near the display panel. Preferably, the call made from this booth is paid with a pre-payment memory card. This memory card also has a memorizing zone in which it is possible to record an advertisement which is precisely the advertisement to be displayed.

8 Claims, 1 Drawing Sheet

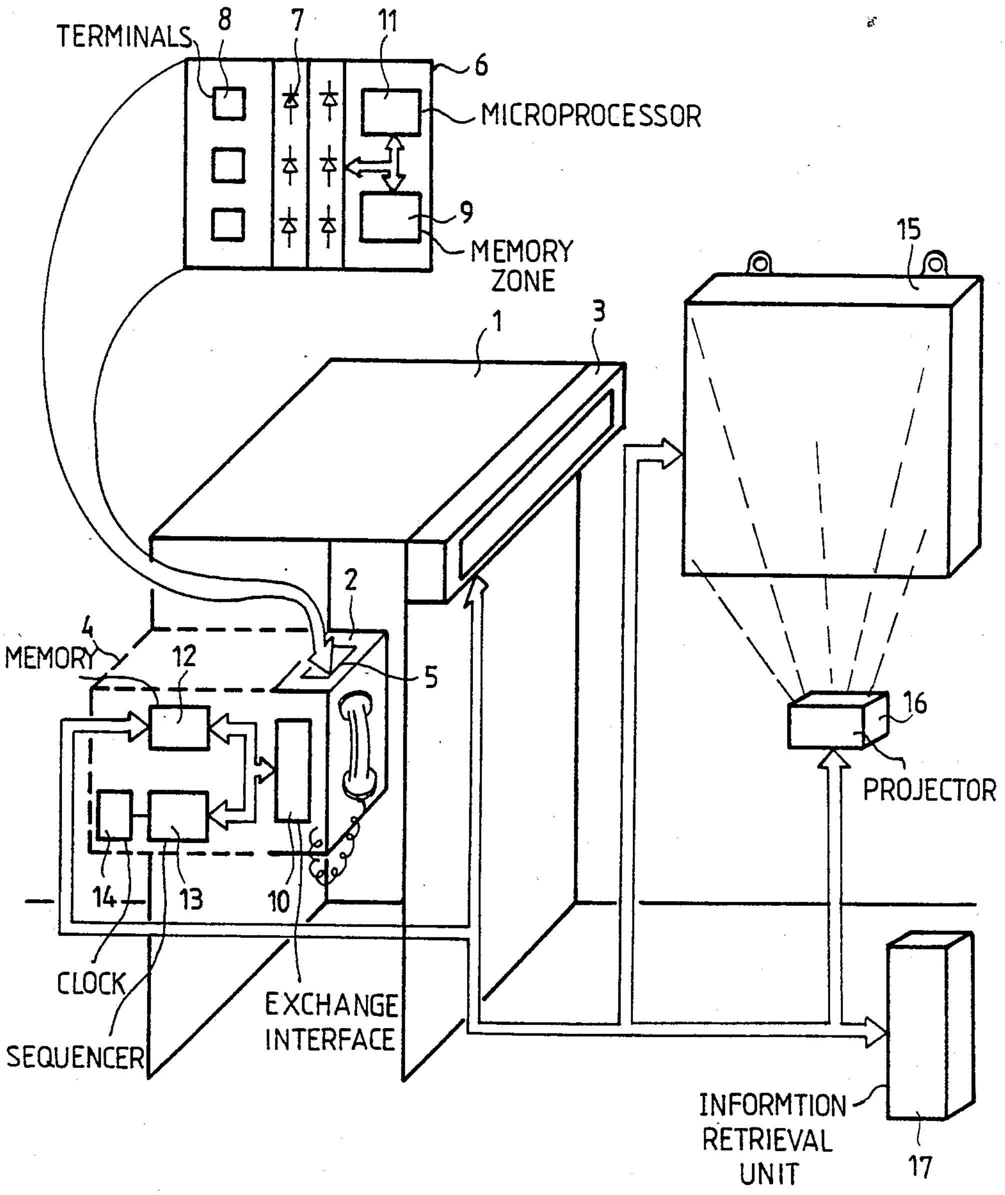
TERMINALS
8
7
11
6
MICROPROCESSOR
9
MEMORY
ZONE
15
1
3
2
4
MEMORY
12
5
16
PROJECTOR
14
13
10
CLOCK
SEQUENCER
EXCHANGE
INTERFACE
INFORMTION
RETRIEVAL
UNIT
17

DEVICE TO MONITOR THE CONTENT AND/OR DURATION OF THE DISPLAY OF ADVERTISEMENTS

BACKGROUND OF THE INVENTION

1. Field of the Invention

An object of the present invention is a device to monitor the content and/or duration of the display of advertisements. It can be applied in active types of display, notably when the display is done through electrical or electronic display devices.

2. Description of the Prior Art

The problems related to the displaying of advertisements are well known. An advertiser signs a contract with a hoardings company by virtue of which the advertising or display panels belonging to the company display, for a pre-determined time, advertisements praising the merits of the products manufactured or marketed by this advertiser. At the end of the contract, the advertisements are replaced by advertisements from other advertisers. When the hoardings are designed to take posters, one simply sticks a poster for the products of an advertiser on top of a previous advertisement. This handling task is difficult to manage. It requires a great number of workmen who have to be regularly sent to the hoardings to change the posters on them.

Other improved methods of display are known. In these methods, the board has a mechanism to invert the posters shown to the public. The principle of this mechanism is based on the use of two cylinders, placed on either side of the panel, used to show the public various posters relating to different advertisements in succession through a window made in this panel. The posters are wound one after the other alternately on each of the cylinders. The mechanism may even be designed to display each poster for a relatively short period, for about 15 seconds, so as to draw the attention of bystanders. Psychologically, the removal of a poster and its replacement by another one constitutes a little mystery which instinctively attracts attention.

In this system of display, however, there is no real check on the duration of the display. For the duration of the display is quite simply shared, possibly in an unequal way, among the various advertisers who have subscribed to the display of their products through this method of display. When their contract of hire is over, the cylinders or rollers have to be dismantled and the strip containing the various advertisements wound around it have to be removed. This strip is then replaced by another strip of advertisements corresponding to advertisements paid for by other advertisers. In practice, the intervals at which the content of the rollers is modified is the same as the intervals at which posters are stuck onto hoardings: often about one week. This modification too entails difficult handling operations.

An object of the invention is to overcome these handling problems while proposing a display system which can provoke the interest of bystanders through the appearance and disappearance of the displayed messages. According to the principle of the invention, the period for which a poster is displayed on a hoarding or display panel is linked to the duration of a telephone communication between two participants, at least one of whom is in a public telephone booth near this display panel. According to a preferred approach, the telephone booth has a telephone with a till to take an electronic pre-payment card and is further provided with means to tap information stored in additional memory zones of these cards and to display this information on a display panel which is functionally linked to this telephone booth. This display panel may be an integral part of the booth.

SUMMARY OF THE INVENTION

An object of the invention, therefore, is a device to monitor the content and/or duration of the display of advertisements, comprising a public telephone, a display panel connected to this telephone and means to display a message on the display panel according to the duration of the telephone communication from this telephone.

BRIEF DESCRIPTION OF THE DRAWINGS

The invention will be better understood from the following description and the accompanying FIGURE. This FIGURE is given purely as an indication and in no way restricts the scope of the invention. The single FIG. 1 shows a device, according to the invention, to monitor the duration of the display of advertisements.

DESCRIPTION OF A PREFERRED EMBODIMENT

A public type of telephone booth 1 has a telephone 2. A display panel 3 is functionally connected to the telephone 2. The device of the invention has means 4 so that the display time of a message on the panel 3 depends on the duration of a telephone communication with the telephone 2. In a preferred way, the telephone 2 has a till 5 to enable the insertion of a pre-payment electronic card 6. This card 6 has pre-payment units 7. To set off the countdown of the units used, the card 6, known as a memory card or an electronic chip card, has terminals such as 8 providing access to its memory. The memory of this card has memory zones where the pre-payment units 7 are programmed. The telephone set 2 has an exchange interface 10 of a standard type with the pre-payment memory card 6 to set off the countdown operation.

In a preferred way, the memory card 6 may also have another memorizing zone 9 to contain an advertisement. The interface 10 may be improved, in telephone sets fitted for this purpose, to provide transmission of the message contained in the zone 9 to the display panel 3. In this case, this panel 3 is of the active type. It has, for example, all the functions of a normal display panel. The card 6 may also have a microprocessor 11 so as to manage the transmission, to a memory 12 of the station 2, of information contained in the memorizing zone 9 of the card 6. Using the memory 12, it is also possible to display the information contained in this memory on the active panel 3.

In a preferred way, the telephone set 2 further has a sequencing circuit 13 to organize, in a period of time, the display of information contained in the memory 12 on the panel. The sequencing circuit essentially takes into account the duration for which a call is exchanged using the card 6 as a pre-payment means. It can simply measure this duration by counting the number of pre-payment units which have been de-programmed from the memory card 6. The sequencing circuit 13 may then compute a period of display which is equal, but is preferably rather proportionate, to the duration for which the card 6 is inserted in the telephone set 2. This sequencer may have a function for the intermittent display during short intervals, for example of about 15 seconds each, of a message contained in the memory 12.

When the booth 1 is used by several successive users, the sequencer 13 and the memory 12 can be organized so as to take into account all the advertisements corresponding to the various cards which have been inserted therein and which, of course, may be different. In this case, the sequencer 13 may organize a temporal multiplexing of the displays of these advertisements. In a preferred way, the multiplexer 13 is linked with a clock 14 which can be further used to modify the multiplexing conditions depending on the time of day. For example, the display may be off at night and may be modified at a faster rate during peak hours when there are lots of bystanders in front of the display panel.

The display panel 3 may be installed in the booth 1. As an alternative, it may be replaced by a panel 15 fixed on a support which may be, if necessary, at quite a distance from the booth 1. Although the memory capacity of the additional memories 9 of the pre-payment card 6 is presently rather limited, there is nothing to prevent the information contained by these memories 9 from representing a picture to be shown on a panel 15. In this case, to be capable of showing these pictures, the board 15 may be provided with an organized and very large number of display elements with commutable luminosity. For example, the panel 15 may be a so-called plasma panel. The panel 15 may also be a white screen on which is projected, from a place facing it, the picture representing the advertisements to be displayed. The projection device 16 may, for example, have a device to illuminate a plate of liquid crystal cells, the image of which is then projected on to the screen 15 by passing through a Schlieren lens. The projection device may also be of the type known under the brand name "Eidophore". The choice of a projection device is preferable because it protects the system from vandals. Moreover, rather than containing the entire message to be displayed, the memory zones of the card may contain only one access key to provide access to an information retrieval unit 17 connected to the booth 1. The information retrieval unit 17, which may also be of the telemetric type, could then send messages to the device 16. Thus, the information retrieval unit provides for monitoring the message displayed. The period of display is always linked to the telephone call.

A system of this type gets rid of the operations for handling the posters. Furthermore, when the memory card is used as an access key, the advertiser may change the content of these messages over a period of time without having to take any action with respect to the content of these cards. .

What is claimed is:

1. A device to display advertisements, comprising a public telephone, a display panel connected to the public telephone, means to display a message on the display panel depending on the duration of a telephone communication, means so that the public telephone is accessible by an electronic pre-payment means, said pre-payment means comprising a memorizing zone, and said device comprising means to retrieve an advertisement to be displayed in accordance with information contained in this memorizing zone.

2. A device according to claim 1 wherein the pre-payment means is a card.

3. A device according to claim 2 wherein the pre-payment card comprises an integrated circuit with a memorizing zone and wherein the device has means to retrieve the advertisement to be displayed from this memory zone.

4. A device according to claim 1 wherein the means to retrieve the advertisement comprise a telephonic information retrieval unit.

5. A device according to any of the claims 1 to 3 comprising means to sequence displays relating to different advertisements during different telephone calls.

6. A device according to claim 5 wherein the sequencing means comprise means to memorize advertisements, a clock and means to display the memorized advertisements at certain times of the day.

7. A device according to any of the claims 1 to 3 wherein the telephone set has means to memorize the advertisements retrieved.

8. A device according to any of the claims 1 to 3 wherein the display device comprises projection means.

* * * * *